United States Patent Office 3,432,484
Patented Mar. 11, 1969

3,432,484
PREPARATION OF THERMOPLASTIC POLYMERS BY LOW TEMPERATURE POLYMERIZATION OF VINYL MONOMERS
Frank J. Welch, Charleston, W. Va., assignor to Union Carbide Corporation, a corporation of New York
No Drawing. Original application Sept. 27, 1961, Ser. No. 141,009, now Patent No. 3,254,033, dated May 31, 1966. Divided and this application Sept. 29, 1965, Ser. No. 491,428
U.S. Cl. 260—88.7                    17 Claims
Int. Cl. C08f 1/76, 1/60

ABSTRACT OF THE DISCLOSURE

The invention relates to a method of preparing thermoplastic polymers of improved properties by polymerizing vinyl monomers at low temperatures, i.e., temperatures of about −50° C. to 0° C., in the presence of certain novel catalyst compositions. The catalysts comprise a mixture of a peroxydicarbonate and a sulfinic acid salt of an N,N-dialkylaniline. Advantages of the process include elimination of premature catalyst decomposition, excellent control over rate of reaction, reduction of undesirable side reactions, and increased crystallinity of the polymer product.

---

This is a division of application Ser. No. 141,009, filed Sept. 27, 1961, which matured into U.S. Patent No. 3,254,033.

The present invention relates to low temperature polymerization of vinyl monomers. More specifically, the invention relates to a process of polymerizing vinyl monomers at relatively low temperatures in the presence of certain novel catalyst compositions to produce thermoplastic polymers.

Vinyl monomers, that is monomers containing the group

are generally polymerized in the presence of and by the action of free radicals produced by the thermal decomposition of compounds such as peroxides, organic azo compounds, and metal alkyls. The use of such compounds as polymerization catalysts requires that the polymerization reaction be conducted at temperatures sufficiently high to effect the production of free radicals which in turn effect polymerization. Generally, these temperatures are on the order of about 40° C. to about 120° C. Polymerization at such temperatures, however, presents serious disadvantages such as premature catalyst decomposition and insufficient control over the rate of reaction.

Premature catalyst decomposition results in localized reactions with attendant localized high temperatures and loss of active catalyst necessary for sustaining the polymerization reaction substantially to completion. This results in lower yields and relatively poor product quality. In addition, a catalyst which is subject to such decomposition produces relatively large amounts of deactivated catalyst residue in the reaction system which hinders polymerization and makes it more difficult to recover and to purify the polymer.

Insufficient control over the rate of reaction can result in a reaction system in which the exothermic heat developed promotes additional premature catalyst decomposition. This in turn causes more heat to be generated in a continuing and accelerating reaction which results in still higher reaction temperatures. These relatively high reaction temperatures can result in both monomer and polymer decomposition which adversely affect the product polymer. Such adverse effects are demonstrated on polymerizing vinyl chloride utilizing known catalysts such as benzoyl peroxide. The polyvinyl chloride obtained is characterized by a relatively low heat distortion temperature, usually on the order of about 70° C. Similarly, methyl methacrylate, when polymerized under identical conditions yields a polymer of low crystalline content.

The present invention provides catalysts which effect polymerization of vinyl monomers at temperatures at or substantially below 0° C., on the order of about −50° C. to about 0° C., to thermoplastic polymers. Polymerization reactions conducted at temperatures at or substantially below 0° C., utilizing the catalysts of the present invention, obviate premature catalyst decomposition with its attendant disadvantages and permit excellent control over the rate of reaction. Furthermore, polymerizing vinyl monomers such as vinyl chloride and methyl methacrylates employing the catalysts of this invention results in the production of polymers which have relatively high crystalline content, and in the case of polymers produced from vinyl chloride, relatively high distortion temperatures, on the order of about 95° C. Consequently, these polymers can be advantageously used in molding and other shaping applications to form self-sustaining film, pipes and other structures which are characterized by excellent physical properties.

Additional advantages which accrue from low temperature polymerization of vinyl monomers utilizing the catalysts of the present invention are the reduction of undesirable side reactions and the achievement of greater stereospecificity of the polymerization reaction. Greater stereospecificity of the polymerization reaction results in increased crystallinity of the polymer produced which results in more desirable physical properties.

In accordance with the present invention it has been found that polymerizable vinyl monomers, that is monomers containing the group

can be effectively polymerized at temperatures on the order of about −50° C. to about 0° C. through the utilization of a catalyst comprising a mixture of a peroxydicarbonate and a sulfinic acid salt of an N,N-dialkylaniline. Generally, from about 0.1 mole to about 5 moles of peroxydicarbonate, per mole of the sulfinic acid salt of an N,N-dialkylaniline, will effect low temperature polymerization to yield satisfactory amounts of polymer. For optimum results it is preferred to use from about 0.3 mole to about 1 mole of the peroxydicarbonate per mole of sulfinic acid salt of an N,N-dialkylaniline. If desired, however, more than about 5 moles of peroxydicarbonate, per mole of sulfinic acid salt of N,N-dialkylaniline can be used but this is economically undesirable as the yield of polymer is not materially increased.

Peroxydicarbonates which are suitable for purposes of the present invention are those having the formula:

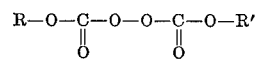

wherein R and R′ are monovalent hydrocarbon radicals, as for example, alkyl radicals, generally containing from 1 to 18 carbon atoms inclusive and preferably containing from 1 to 8 carbon atoms inclusive, such as methyl, ethyl, n-propyl, t-butyl, n-hexyl, 2-ethylhexyl, n-octyl, n-dodecyl and the like; or cycloalkyl radicals, generally containing from 3 to 18 carbon atoms inclusive and preferably containing from 3 to 10 carbon atoms inclusive, such as cyclopropyl, cyclopentyl, cyclohexyl and the like; or unsaturated aliphatic hydrocarbon radicals, generally containing from 2 to 18 carbon atoms inclusive, and preferably containing from 2 to 8 carbon atoms inclusive, such as vinyl, allyl, and the like; or unsaturated cycloaliphatic hydrocarbon radicals, generally containing from 5 to 18 carbon atoms inclusive and preferably containing from 5 to 10 carbon atoms inclusive, or aryl radicals, generally containing from 6 to 18 carbon atoms inclusive and preferably containing from 6 to 10 carbon atoms inclusive, as for example, phenyl, tolyl, naphthyl and the like; or aralkyl radicals generally containing from 7 to 18 carbon atoms inclusive and preferably containing from 7 to 10 carbon atoms inclusive, such as benzyl, 2-phenylethyl, 3-phenylpropyl, 1-phenylbutyl, 1-phenyldodecyl and the like. Particularly preferred for purposes of this invention is diisopropyl peroxydicarbonate.

Peroxydicarbonates can be prepared by the reaction of sodium peroxide with dihaloformate as described in detail in U.S. Patent 2,370,588 issued Feb. 27, 1945, to F. P. Strain.

Sulfinic acid salts of N,N-dialkylanilines which are admixed with the peroxydicarbonates to produce the catalysts of the present invention are those having the formula:

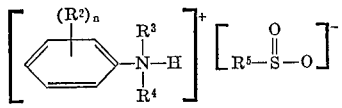

wherein each individual $R^2$ which can be the same or different is an alkyl radical, generally containing from 1 to 4 carbon atoms inclusive and preferably containing from 1 to 3 carbon atoms inclusive, such as methyl, ethyl, n-propyl and the like; $n$ is an integer generally having a value of 0 to 3 inclusive, preferably having a value of 0 to 1 inclusive; $R^3$ and $R^4$, which can be the same or different, are alkyl radicals, generally containing from 1 to 4 carbon atoms inclusive and preferably containing from 1 to 2 carbon atoms inclusive, such as methyl, ethyl, n-propyl, n-butyl and the like; and $R^5$ is a monovalent hydrocarbon radical as previously defined for R and R'.

Sulfinic acid salts of N,N-dialkylanilines can be conveniently prepared by reacting a sulfinic acid having the formula:

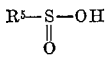

or a metal salt of the sulfinic acid having the formula:

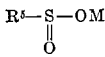

wherein $R^5$ in each case is as previously defined and M is an alkali or an alkaline earth metal, for instance, sodium, potassium, lithium, magnesium, calcium, and the like; with an N,N-dialkylaniline having the formula:

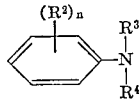

or an acid salt thereof having the formula:

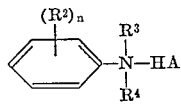

wherein in each case $R^2$, $R^3$, $R^4$ and $n$ are as previously defined and HA is an organic of an inorganic acid having a pK value of less than about 6.

Illustrative of such organic acids are those having the formula:

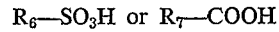

wherein $R^6$ and $R^7$ can be hydrogen, alkyl radicals containing from 1 to 6 carbon atoms inclusive, or phenyl radicals and can be substituted or unsubstituted with functional groups such as chloro, fluoro, hydroxyl, carboxyl, and the like.

Suitable organic acids include acetic acid, oxalic acid, benzoic acid, chloroacetic acid, formic acid, p-toluensulfonic acid, benzene sulfonic acid, methane sulfonic acid, ethane sulfonic acid and the like.

Illustrative of suitable inorganic acids are the following: sulfuric acid, hydrochloric acid and the like.

Various amounts of a sulfonic acid or metal salt thereof and an N,N-dialkylaniline or acid salt thereof can be reacted to produce the corresponding sulfinic acid salt of N,N-dialkylaniline. Using from about 0.2 mole to about 5 moles of a sulfinic acid or the metal salt of a sulfinic acid per mole of an N,N-dialkylaniline or acid salt thereof is satisfactory. Using more than about 5 moles of the sulfinic acid reactant per mole of the N,N-dialkylaniline reactant does not materially increase the yield of the corresponding sulfinic acid salt of N,N-dialkylaniline and is economically unattractive. Optimum results are achieved using about equimolar amounts of the reactants. When reacting an alkali metal salt of sulfinic acid with an N,N-dialkylaniline it is preferable to have a free acid, such as has been heretofore described, present in the reaction mixture. In the absence of free acid, the formation of the sulfinic acid salt of N,N-dialkylaniline proceeds slowly.

The temperature at which the reaction between the sulfinic acid reactant and the dialkylaniline reactant is conducted can be varied over a wide range, from as low as −50° C. to about 0° C. At temperatures lower than about −50° C., the reaction proceeds sluggishly. A temperature in the range of about −30° C. to about 0° C. is most preferred.

It is also preferred to conduct the reaction between a sulfinic acid reactant with an N,N-dialkylaniline reactant in contact with an organic diluent which is a solvent for the starting materials and non-reactive with respect to the starting materials and the final product. Generally, the reactants are dissolved in a desired diluent and the solutions then admixed. The actual diluent used will depend upon the starting materials and the temperature at which the reaction is to be conduced. The organic diluent should have a boiling point at or above the reaction temperature. It is customary to use the organic diluent in amounts of at least about 50 percent by weight based on the weight of the starting materials. The upper limit with respect to the amount of organic diluent used will depend upon the rate at which it is desired to conduct the reaction. The more dilute the reaction mixture, the slower the rate of reaction. From a practical standpoint the organic diluent is used in amounts up to about 500 percent by weight based on the weight of the starting materials.

Suitable organic diluents are hereinafter described.

The process, by which the sulfinic acid salt of N,N-dialkylaniline is produced, is conducted by simply admixing the reactants at the desired temperature. The reaction between the sulfinic acid reactant and the dialkylaniline reactant to produce the corresponding sulfinic acid salt of an N,N-dialkylaniline is practically instantaneous in that some of the desired product is formed upon admixing of the reactants.

As stated, the catalysts of this invention, which are stable at temperatures lower than about −50° C., have particular utility for the polymerization of vinyl monomers to produce thermoplastic polymers. In the utilization of the catalysts for vinyl monomer polymerization, a vinyl monomer or mixture of vinyl monomers is charged into a suitable reaction vessel which has been precooled to a temperautre which is at or slightly below the temperature at which the reaction is to be conducted. Precooling of the reaction vessel insures that there will be no loss of monomer through evaporation. In addition, precooling facilitates attainment of the desired reaction temperature. If the monomer to be polymerized has a boiling point below or near the reaction temperature, the reaction should be conducted under pressure to insure against loss of monomer. If the boiling point of the monomer is substantially above the reaction temperature, then the reaction can be conducted at atmospheric pressure without danger of loss of monomer.

The peroxydicarbonate and the sulfinic acid salt of N,N-dialkylaniline, both usually cooled to the temperature at which the reaction is to be conducted, are then added separately to the reaction vessel, which contains the monomer or mixture of monomers to be polymerized, in amounts sufficient to provide a catalytic amount, that is, in an amount sufficient to promote and effect polymerization of the monomer, with the relative amount of peroxydicarbonate to sulfinic acid salt being as previously described. Generally, the amount of catalyst used is from about 0.5 to about 10 percent by weight based on the weight of the monomer or monomers charged. More than about 10 percent by weight of catalyst can be used but this is economically undesirable. If is preferred to employ from about 0.8 to about 5 percent by weight catalyst based on the weight of the monomer or monomers charged.

If desired, rather than adding the sulfinic acid salt of an N,N-dialkylaniline to the reaction vessel as a preformed compound, this compound can be formed in situ using the reactants and amount thereof previously noted.

Once the catalyst has been added to or formed in the reaction vessel, which contains the monomer or mixture of monomers to be polymerized, it is then desirable to purge the reaction vessel with nitrogen or other inert gas. This removes substantially all of the oxygen from the surface of the reaction mixture and lessens the occurrence of oxidative side reactions.

The polymerization reaction can be conducted under atmospheric, sub-atmospheric or super-atmopsheric pressure. If the polymerization reaction is to be conducted under super-atmospheric pressure, the reaction vessel is sealed with a blanket of an inert gas provided therein.

After the catalyst has been added to the reaction vessel, the temperature of the reaction mixture is allowed to reach the desired value, generally on the order of about −50° C. to about 0° C. and preferably from about −30° C. to about 0° C. This temperature is then maintained for a period of time ranging from about 1 to about 48 hours.

The polymerization reaction can be conducted, if desired, in a reaction medium containing an organic diluent. Suitable diluents include, among others, alcohols such as methanol, ethanol, n-propanol, isopropanol, n-butanol, sec-butanol, tert-butanol and the like; ketones such as acetone, methylethyl ketone, diethyl ketone, methylisobutyl ketone and the like; hydrocarbons such as n-heptane, n-octane, benzene, toluene and the like; ethers such as dimethyl ether, diethyl ether, dioxane and the like; alkyl halides such as dichloromethane, tetrachloroethane and the like; nitriles such as acetonitrile, propionitrile and the like; amides such as dimethylformamide and the like; esters such as methyl formate, ethyl formate, n-propyl formate, methyl acetate, ethyl acetate and the like. The use of an organic diluent in the polymerization reaction facilitates agitation of the reaction mixture and serves to remove the heat of reaction.

Amounts of diluent used are the same as those previously noted for the reaction between the sulfinic acid reactant and the dialkylaniline reactant.

Recovery of the polymer from the reaction vessel is conveniently accomplished by direct filtration, if the polymer is insoluble in the mixture, or by adding the contents of the reaction vessel to a diluent in which the polymer is insoluble so that the polymer precipitates. The polymer is then recovered as a filter cake by a simple filtration operation. Optionally, the polymer can be recovered by evaporation of the unreacted monomer and diluent.

If desired, the polymer can then be washed with organic liquids, such as methanol and the like and then dried by passing air therethrough.

Illustrative of polymerizable vinyl monomers and mixtures thereof which can be polymerized utilizing the catalysts of the present invention are the following: vinyl aryls such as styrene, o-methoxystyrene, p-methoxystyrene, m-methoxystyrene, o-nitrostyrene, m-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl metracrylate, methyl ethacrylate, ethyl ethacrylate, acrylamide, N-methyl acrylamide, N,N-dimethylacrylamide, methacrylamide, N-methyl methacrylamide, N,N-dimethyl methacrylamide, acrylonitrile, chloroacrylonitrile, methacrylonitrile, ethacrylonitrile and the like; alkyl esters of maleic and fumaric acid such as dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidine, ethyl methylene malonate and the like; conjugated dienes, such as butadiene, 1,2-chlorobutadiene, isoprene; and non-conjugated dienes, such as ethylene glycol dimethacrylate, divinyl benzene and the like. It is to be understood that modifiers can also be used in conducting the polymerization reactions of the present invention as are well known in the art. Illustrative of such modifiers are emulsifiers, and the like.

In the following examples which are illustrative and not intended to limit the scope of this invention reduced viscosity determinations were made and calculated using the following equation:

$$R.V. = \frac{T_1 - T_2}{T_2 C}$$

wherein:

$T_1$=Efflux time for the polymer solution.
$T_2$=Efflux time for the solvent.
$C$=Concentration of the polymer solution in grams of polymer per 100 milliliters of solvent.

Heat distortion values noted in this specification were determined according to ASTMD 648-56.

EXAMPLE 1

Into a Pyrex glass tube which was at a temperature of −80° C. and contained 20 grams (0.32 mole) of liquid vinyl chloride, there was added 0.1 gram (0.52 millimole) of diisopropyl peroxydicarbonate, 0.2 gram (0.68 millimole) of p-toluenesulfonic acid salt of N,N-dimethylaniline and 0.2 gram (1.12 millimoles) of sodium p-toluenesulfinate, each as a ten percent by weight solution in methanol. The tube was then purged by means of nitrogen gas, tightly capped, placed in a water-ethylene glycol bath, which was maintained at a temperature of −8° C., and agitated therein continuously for a period of 1.5 hours. At the end of this period, the tube was removed from the bath, cooled to a temperature of −80° C. and opened. The contents of the tube were dispersed in about 200 milliliters of methanol and this dispersion was then filtered. The filter cake recovered was washed with 200 milliliters of methanol and then dried by passing air, maintained at 60° C., therethrough. Six grams of polyvinyl chloride were recovered. The polyvinyl chloride so produced has a reduced viscosity in cyclohexanone at 30° C. of 1.29.

The reaction between sodium p-toluenesulfinate and p-toluenesulfonic acid salt of N,N-dimethylaniline to produce the corresponding sulfinic acid salt of N,N-dimethylaniline can be illustrated by the following equation:

mer and the reduced viscosity of each polymer are indicated in the table which follows:

| Tube | Monomer | Polymerization time in hours | Yield in grams | Reduced viscosity |
|---|---|---|---|---|
| 5 | Styrene | 33 | 1.5 | 0.33 |
| 6 | Methyl methacrylate | 19 | 30 | 2.03 |
| 7 | Vinyl acetate | 2.5 | 10 | 0.81 |
| 8 | Acrylonitrile | 2.5 | 8 | 2.31 |

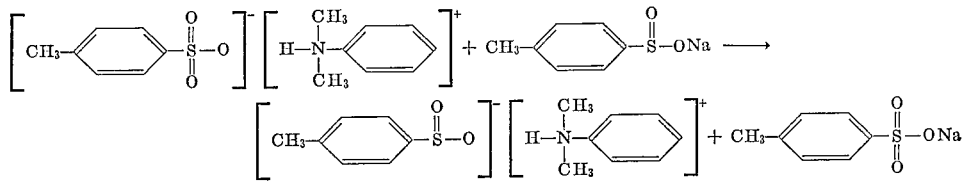

Example 1 was repeated using the same procedure and reactants with the exception that p-toluenesulfonic acid salt of dimethylaniline was omitted from the charge. No polymer was formed after eighteen hours.

Example 1 was also repeated a second time using the same procedure and reactants with the exception that diisopropyl peroxydicarbonate was omitted from the charge. No polymer was formed after twenty-one hours.

EXAMPLE 2

Into each of four Pyrex glass tubes, maintained at a temperature of −80° C., there was charged 20 grams (0.32 mole) of liquid vinyl chloride, 0.060 gram (0.312 millimole) of diisopropyl peroxydicarbonate, 0.10 gram (0.34 millimole) of p-toluenesulfonic acid salt of N,N-dimethylaniline, 0.060 gram (0.312 millimole) of sodium p-toluenesulfinate and 10 milliliters of diluent, the particular diluent in each case being noted in the table which follows. Each tube was then purged with nitrogen gas, tightly capped and the polymerization of vinyl chloride monomer in each tube conducted in a manner as described in Example 1. The recovery of polymer from each tube was also accomplished in a manner as described in Example 1. The polymerization time, yield of polymer and the reduced viscosity of the polymer are also indicated in the table which follows:

| Tube | Diluent | Polymerization time in hours | Yield in grams | Reduced viscosity |
|---|---|---|---|---|
| 1 | Methanol | 1.5 | 6.0 | 1.32 |
| 2 | Acetone | 3.5 | 3.5 | 1.24 |
| 3 | Diethylene glycol dimethyl ether | 3.5 | 3.0 | 0.91 |
| 4 | Toluene | 3.5 | 2.0 | 0.95 |

Reduced viscosity determinations were made at 30° C. using cyclohexanone as the solvent.

EXAMPLE 3

Into each of four Pyrex glass tubes, maintained at a temperature of about −20° C., there was charged 20 grams of a liquid vinyl monomer. The vinyl monomer used in each instance is noted in the table below. To each of these tubes, there was then added 0.062 gram (0.322 millimole) of diisopropyl peroxydicarbonate, 0.14 gram (0.474 millimole) of p-toluenesulfonic acid salt of N,N-dimethylaniline, and 0.080 gram (0.416 millimole) of sodium p-toluenesulfinate, each as ten percent by weight solutions in methanol. Each tube was then purged with nitrogen gas, tightly capped and the polymerization of vinyl monomer in each tube conducted in a manner as described in Example 1. The recovery of polymer from each tube was also accomplished in a manner as described in Example 1. Polymerization time, yield of poly- Reduced viscosity determinations for polystyrene, polymethyl methacrylate and polyvinyl acetate were made at 30° C. using benzene as the solvent. Reduced viscosity determination for polyacrylonitrile was made at 30° C. using dimethylformamide as the solvent.

EXAMPLE 4

Into a three liter flask, which was maintained at −80° C. and fitted with a stirrer and condenser, there was charged 1500 grams (24 moles) of liquid vinyl chloride, after the flask had been purged with nitrogen gas. The liquid vinyl chloride was brought to reflux, about −12° C., and 2.0 grams of n-hexylmercaptan added thereto. Following the addition of n-hexylmercaptan, there was added into the flask 4.5 grams (15 millimoles) of p-toluenesulfonic acid salt of N,N-dimethylaniline, 2.0 grams (10.5 millimoles) of diisopropyl peroxydicarbonate, and 2.6 grams (14.5 millimoles) of sodium p-toluenesulfinate, each as a solution in 20 milliliters of methanol. The resultant solution was maintained at reflux, about −12° C., with stirring for 2.8 hours. At the end of this period, the slurry which had formed was diluted with methanol which was chilled to a temperature of about −30° C. and the slurry filtered. The polymer, recovered as a filter cake, was washed with about 2 liters of methanol and dried as described in Example 1. One hundred sixty-five grams of polyvinyl chloride were recovered. The polyvinyl chloride so produced had a heat distortion temperature of 97° C. and a reduced viscosity, in cyclohexanone at 30° C., of 2.0.

EXAMPLE 5

Into a two liter flask fitted with a stirrer and condenser, there was charged 600 grams (9.6 moles) of liquid vinyl chloride, after the flask had been purged with nitrogen gas. The vinyl chloride was maintained at −30° C. and there was added thereto 4.2 grams (14.22 millimoles) of p-toluenesulfonic acid salt of N,N-dimethylaniline, 1.9 grams (10 millimoles) of diisopropyl peroxydicarbonate and 2.4 grams (13.4 millimoles) of sodium p-toluenesulfinate, each as solutions in 20 milliliters of methanol. The resultant mixture was stirred for 5 hours at a temperature of −30° C. The polyvinyl chloride which was so produced was recovered as described in Example 4. Forty-two grams of polyvinyl chloride were recovered. The polymer had a heat distortion temperature of 90° C. and had a reduced viscosity, in cyclohexanone at 30° C., of 1.69.

In order to further demonstrate that all components of the catalyst are necessary in order to effect polymerization of vinyl monomer in satisfactory yield, various catalysts were used in order to polymerize vinyl chloride using the procedure described in Example 1. The charge in each instance was made up of 20 grams (0.32 mole) of liquid vinyl chloride and the materials noted in the table which follows:

| Tube | Peroxide in grams | Sodium p-toluene-sulfinate in grams | p-Toluene-sulfonic acid salt of N,N-di-methylani-line in grams | Polymerization time in hours | Yield in grams |
|---|---|---|---|---|---|
| 13 | Diisopropyl peroxydi-carbonate 0.06 | 0.80 | 0.14 | 1.3 | 2.8 |
| 14 | Diisopropyl peroxydi-carbonate 0.10 | | 0.10 | 22 | 0 |
| 15 | do | 0.10 | | 22 | 0 |
| 16 | Acetyl peroxide 0.10 | 0.10 | 0.10 | 22 | 0 |
| 17 | Isopropyl phenyl hydrogen peroxide 0.10 | 0.10 | 0.10 | 22 | 0 |
| 18 | Trichloro-acetyl perox-ide 0.07 | 0.06 | 0.10 | 48 | 0 |
| 19 | Diisopropyl peroxydi-carbonate 0.10 | 0.10 | 0.10 | 3 | 10 |

EXAMPLE 6

This example was conducted in a manner as described in Example 1 with the exception that various acids were used in lieu of p-toluenesulfonic acid salt of N,N-dimethyl-aniline. The acids and the amounts thereof used in each instance to polymerize 30 grams (0.48 mole) of liquid vinyl chloride which was in admixture with 0.062 gram (0.312 millimole) of diisopropyl peroxydicarbonate, 0.080 gram (0.448 millimole) of sodium p-toluenesulfinate and 0.055 gram (0.45 millimole) of dimethylaniline.

| Tube | Acid | Amount of acid in grams | Polymeri-zation time in hours | Yield in grams | Reduced viscosity |
|---|---|---|---|---|---|
| 21 | Nitric | 0.028 | 18 | 16 | 3.38 |
| 22 | Hydrochloric | 0.016 | 2 | 2.5 | 0.56 |
| 23 | Sulfuric | 0.22 | 18 | 5.0 | 4.17 |
| 24 | Acetic | 0.027 | 2 | 4.0 | 1.81 |

Reduced viscosity determinations were made at 30° C. using cyclohexanone as the solvent.

The reaction involving N,N-dialkylaniline, an acid and metal salt of sulfinic acid can be represented by the following equations wherein for purposes of illustration the N,N-dialkylaniline is N,N-dimethylaniline, the acid is represented by general formula HA and H being the cation and A being the anion of the acid, and the metal salt of sulfinic acid is sodium p-toluenesulfinate.

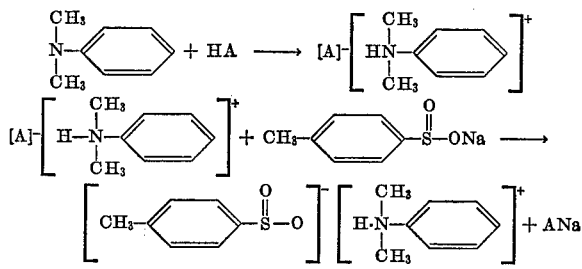

In a manner as described in Example 3, a mixture of vinyl chloride and vinyl acetate can be polymerized to produce a thermoplastic copolymer.

What is claimed is:

1. A process for preparing a thermoplastic polymer which comprises admixing at a temperature of from about −50° C. to about 0° C. a polymerizable vinyl monomer with a catalytic amount of a composition comprising at least about 0.1 mole of a peroxydicarbonate of the formula:

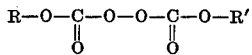

wherein R and R' are monovalent hydrocarbon radicals, per mole of a sulfinic acid salt of an N,N-dialkylaniline of the formula:

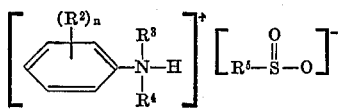

wherein $R^3$, $R^4$ and each individual $R^2$ are alkyl radicals, $R^5$ is a monovalent hydrocarbon radical and $n$ is an integer having a value of 0 to 3 inclusive, whereby said monomer polymerizes to a thermoplastic polymer.

2. A process for preparing a thermoplastic polymer which comprises admixing at a temperature of from about −50° C. to about 0° C. a polymerizable vinyl monomer with from about 0.5 percent by weight to about 10 percent by weight, based on the weight of said monomer, of a composition comprising from about 0.1 mole to about 5 moles of a peroxydicarbonate of the formula:

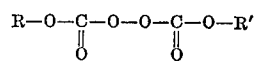

wherein R and R' are monovalent hydrocarbon radicals, per mole of a sulfinic acid salt of an N,N-dialkylaniline of the formula:

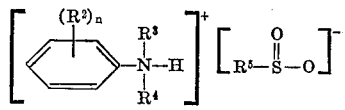

wherein $R^3$, $R^4$ and each individual $R^2$ are alkyl radicals, $R^5$ is a monovalent hydrocarbon radical and $n$ is an integer having a value of 0 to 3 inclusive, whereby said monomer polymerizes to a thermoplastic polymer.

3. A process as defined in claim 2 wherein the monomer is vinyl chloride.

4. A process as defined in claim 2 wherein the monomer is styrene.

5. A process as defined in claim 2 wherein the monomer is methyl methacrylate.

6. A process as defined in claim 2 wherein the monomer is vinyl acetate.

7. A process as defined in claim 2 wherein the monomer is acrylonitrile.

8. A process as defined in claim 2 wherein the peroxy-dicarbonate is diisopropyl peroxydicarbonate.

9. A process as defined in claim 2 wherein the sulfinic acid salt is of the formula:

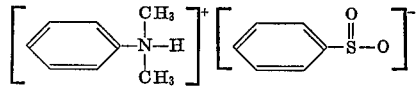

10. A process for preparing a thermoplastic polymer which comprises admixing at a temperature of from about −50° C. to about 0° C. a polymerizable vinyl monomer with from about 0.5 percent by weight to about 10 percent by weight, based on the weight of said monomer, of a composition comprising from about 0.3 mole to about 1 mole of a peroxydicarbonate of the formula:

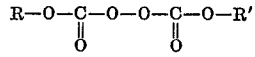

wherein R and R' are monovalent hydrocarbon radicals, per mole of a sulfinic acid salt of an N,N-dialkylaniline of the formula:

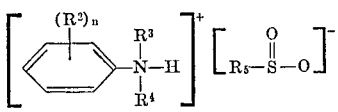

wherein $R^3$, $R^4$ and each individual $R^2$ are alkyl radicals, $R^5$ is a monovalent hydrocarbon radical and $n$ is an integer having a value of 0 to 3 inclusive, whereby said monomer polymerizes to a thermoplastic polymer.

11. A process for preparing a thermoplastic polymer which comprises admixing, at a temperature of from about −50° C. to about 0° C., a polymerizable vinyl monomer with from about 0.8 to about 5 percent by weight, based on the weight of said monomer, of a composition comprising from about 0.3 mole to about 1 mole of a peroxydicarbonate of the formula:

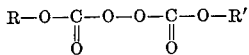

wherein R and R′ are alkyl radicals, per mole of a sulfinic acid salt of an N,N-dialkylaniline of the formula:

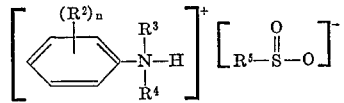

wherein $R^3$, $R^4$ and each individual $R^2$ are alkyl radicals, $R^5$ is an aryl radical and $n$ is an integer having a value of 0 to 1 inclusive, whereby said monomer polymerizes to a thermoplastic polymer.

12. A process for preparing a thermoplastic polymer which comprises admixing at a temperature of from about −30° C. to about 0° C., a polymerizable vinyl monomer with from about 0.8 to about 5 percent by weight, based on the weight of said monomer, of a composition comprising from about 0.3 mole to about 1 mole of a peroxydicarbonate of the formula:

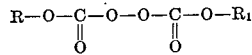

wherein R and R′ are alkyl radicals, per mole of a sulfinic acid salt of an N,N-dialkylaniline of the formula:

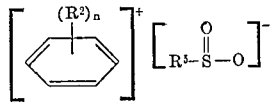

wherein $R^3$, $R^4$ and each individual $R^2$ are alkyl radicals, $R^5$ is an aryl radical and $n$ is an integer having a value of 0 to 1 inclusive, whereby said monomer polymerizes to a thermoplastic polymer.

13. A process for preparing a thermoplastic polymer which comprises admixing in an organic diluent and at a temperature from about −50° C. to about 0° C., a polymerizable vinyl monomer with from about 0.5 to about 10 percent by weight, based on the weight of said monomer, of a composition comprising from about 0.1 mole to about 5 moles of a peroxydicarbonate of the formula:

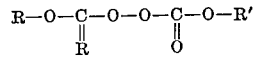

wherein R and R′ are alkyl radicals, per mole of a sulfinic acid salt of an N,N-dialkylaniline of the formula:

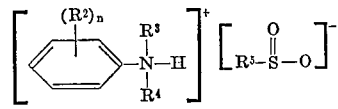

wherein $R^3$, $R^4$ and each individual $R^2$ are alkyl radicals, $R^5$ is an aryl radical and $n$ is an integer having a value of 0 to 3 inclusive, whereby said monomer polymerizes to a thermoplastic polymer.

14. A process for preparing a thermoplastic polymer which comprises admixing at a temperature of from about −50° C. to about 0° C. a polymerizable vinyl monomer with at least about 0.1 mole of a peroxydicarbonate of the formula:

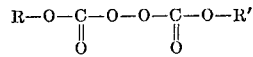

wherein R and R′ are hydrocarbon radicals, an N,N-dialkylaniline reactant which is a member selected from the group consisting of a compound of the formula:

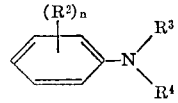

and a compound of the formula:

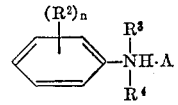

wherein $R^2$, $R^3$ and $R^4$ are alkyl radicals, $n$ is an integer having a value of from 0 to 3 inclusive, and A is the anion of an acid having a pK value of less than about 6, and at least about 0.2 mole, per mole of said N,N-dialkylaniline reactant, of a sulfinic acid reactant which is a member selected from the group consisting of a compound of the formula:

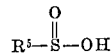

and alkali metal salts thereof which are of the formula:

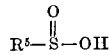

wherein $R^5$ is a monovalent hydrocarbon radical and M is an alkali metal ion, whereby said monomer polymerizes to a thermoplastic polymer.

15. A process for preparing a thermoplastic polymer which comprises admixing at a temperature of from about −50° C. to about 0° C. a polymerizable vinyl monomer with at least about 0.1 mole of a peroxydicarbonate of the formula:

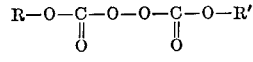

wherein R and R′ are monovalent hydrocarbon radicals, an N,N-dialkylaniline reactant of the formula:

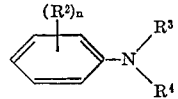

wherein $R^2$, $R^3$ and $R^4$ are alkyl radicals containing from 1 to 4 carbon atoms and $n$ is an integer having a value of from 0 to 3 inclusive, and at least about 0.2 mole, per mole of said N,N-dialkylaniline reactant, of a sulfinic acid reactant of the formula:

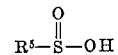

wherein $R^5$ is an aryl radical, whereby said monomer polymerizes to a thermoplastic polymer.

16. A process for preparing a thermoplastic polymer which comprises admixing at a temperature of from about −50° C. to about 0° C. a polymerizable vinyl monomer with at least about 0.1 mole of a peroxydicarbonate of the formula:

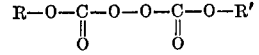

wherein R and R′ are monovalent hydrocarbon radicals, an acid salt of an N,N-dialkylaniline reactant of the formula:

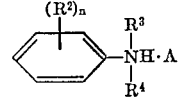

wherein $R^2$, $R^3$ and $R^4$ are alkyl radicals containing from 1 to 4 carbon atoms, A is the anion of an acid having a pK value of less than about 6, and $n$ is an integer having a value of from 0 to 3 inclusive, and at least 0.2 mole, per mole of said acid salt of N,N-dialkylaniline, of a sulfinic acid reactant of the formula:

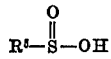

wherein $R^5$ is an aryl radical, whereby said monomer polymerizes to a thermoplastic polymer.

17. A process for preparing a thermoplastic polymer which comprises admixing at a temperature of from about −50° C. to about 0° C. a polymerizable vinyl monomer with at least about 0.1 mole of a peroxydicarbonate of the formula:

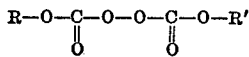

wherein R and R' are monovalent hydrocarbon radicals, an acid salt of an N,N-dialkylaniline of the formula:

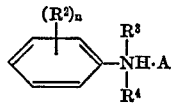

wherein $R^2$, $R^3$ and $R^4$ are alkyl radicals containing from 1 to 4 carbon atoms, A is the anion of an acid having a pK value of less than 6 and $n$ is an integer having a value of from 1 to 3, and at least 0.2 mole, per mole of said acid salt of N,N-dialkylaniline, of a sulfinic acid reactant of the formula:

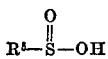

wherein $R^5$ is an aryl radical, whereby said monomer polymerizes to a thermoplastic polymer.

References Cited

UNITED STATES PATENTS

| | | | |
|---|---|---|---|
| 2,728,756 | 12/1955 | Friedlander | 260—453 |
| 2,812,308 | 11/1957 | Shelton et al. | 252—438 |
| 3,081,348 | 5/1963 | Spacht | 252—438 X |
| 3,112,279 | 11/1963 | Papee et al. | 252—438 |
| 3,117,112 | 1/1964 | Mirabile et al. | 260—88.7 |
| 3,124,561 | 3/1964 | Jenkins | 260—88.7 |

OTHER REFERENCES

Bredereck et al., Chem. Berichte, vol. 87, pp. 129–39 (1954).

Bredereck et al., Makromol Chem., vol. 12, pp. 100–9 (1954).

JOSEPH L. SCHOFER, *Primary Examiner.*

HARRY WONG, JR., *Assistant Examiner.*

U.S. Cl. X.R.

260—47, 63, 78.4, 78.5, 80, 82.1, 83.1, 83.5, 84.7, 85.5, 85.7, 87.5, 88.1, 88.3, 89.1, 89.5, 89.7, 91.1, 91.7, 92.8, 93.5, 94.2